Patented July 18, 1950

2,515,353

UNITED STATES PATENT OFFICE 2,515,353

METHOD OF TREATING SUGAR-CONTAINING SOLUTIONS

John J. Naugle, New York, N. Y.

No Drawing. Application April 11, 1947,
Serial No. 740,975

18 Claims. (Cl. 127—48)

My present invention relates to the treatment of impurity-containing solutions, and more particularly, to the defecation, decolorization and deodorization of cane and other sugar-bearing plant juices, raw sugar melts, washed raw sugar melts and fruit juices.

Clarification of the above specifically referred to solutions has heretofore been accomplished by defecation with lime, but I have found that such treatment has certain disadvantages attendant thereto. For example, the degree to which the colloidal materials, gums, waxes and color and odor-imparting substances can be removed leaves much to be desired; the temperature to which the solution must be raised to carry out the treatment is such as to cause undue darkening; the normal ash content of the solution is increased; and the muds thereof have a low filtration rate.

It is, therefore, among the purposes of my present invention to overcome the foregoing disadvantages and provide a double defecation process whereby a clear, brilliant, extremely light colored and substantially odorless sugar solution, of fine flavor, may be obtained from cane and other sugar-bearing plant juices, raw sugar melts, washed raw sugar melts and fruit juices; said process thoroughly removing from the starting material the impurities above enumerated, and this, without adding to the ash content thereof, and in a manner which greatly improves the filtration rate of the muds and enables the more rapid and complete crystallization of sugar.

These, and other objects of my present invention, which will become obvious as the detailed description thereof progresses, are attained in the following manner:

To the starting material which, as indicated, may be cane or other sugar-bearing plant juice, a raw sugar melt, a washed raw sugar melt or a fruit juice, I add from about .25% to about 6%, based on the weight of the sugar solids in said starting material, of a calcined mixture of a magnesium compound-containing material and a waste material, hereinafter called the combined products, resulting from the manufacture of Portland cement clinker, for example, in accordance with the methods described in United States Patents Nos. 1,939,921, 2,006,939, 2,021,623, 2,028,313, 2,130,574, 2,144,254, 2,161,010, 2,161,011, 2,162,525, 2,214,716 and 2,214,717.

These so-called combined products include certain mineral components and have been found, therefore, to constitute an excellent raw materials source for the production of a highly activated defecant and adsorbent capable of efficiently decolorizing and deodorizing, among others, the liquids previously referred to.

The amount of the aforementioned calcined mixture added should be sufficient to raise the pH of the solution being treated to from about 9.0 to about 10.0, and the mixture should be added dry to permit better control over the relative proportions of the components thereof. Also, because the active portions of the mixture readily take up water, said mixture should, preferably, be freshly prepared immediately before using, preferably, in the following manner:

It has been found in practice that the above referred to combined waste products resulting from the manufacture of Portland cement clinker in accordance with the above set forth United States patents generally have an average chemical composition as follows:

|  | Percent |
|---|---|
| Silicon dioxide | 40.32 |
| Aluminum oxide | 13.37 |
| Ferric oxide | 1.98 |
| Ferric sulfide | 0.94 |
| Ferrous sulphate | 0.07 |
| Calcium carbonate | 31.65 |
| Magnesium carbonate | 1.37 |
| Magnesium oxide | 2.73 |
| Potassium oxide | 2.36 |
| Sodium oxide | 1.08 |
| Carbon | 2.21 |
| Water and undetermined | 1.92 |
| Total | 100.00 |

It is, of course, to be clearly understood that the present invention is not limited to the use of the combined products of the specific analysis set forth, nor is it limited to the waste products resulting from the manufacture of Portland cement clinker only in accordance with the aforesaid United States patents.

In the above, conventionally recited chemical analysis, the silicon dioxide is found, in pure form, in quartz, and, combined with metals to form complex silicates, as mica, feldspar and talc. The aluminum oxide, ferric oxide, magnesium oxide, potassium oxide, sodium oxide and water are found, forming complex silicates, in the aforesaid mica, feldspar and talc. The carbon is found free as graphite. The calcium carbonate, magnesium carbonate and ferric sulfide are found in the form of calcite, dolomite and iron pyrite.

The approximate mineral composition of the combined products is as follows:

|  | Percent |
|---|---|
| Calcite | 32.8 |
| Dolomite | 2.0 |
| Iron pyrite | 1.0 |
| Quartz | 12.0 |
| Graphite carbon | 2.2 |
| Mica | 30.0 |
| Feldspar | 14.0 |
| Talc | 6.0 |
| Total | 100.0 |

When the combined products are calcined under appropriate conditions, the carbon is burned, activated metallic oxides are produced, and physical changes take place in the mica, feldspar and talc. These chemical and physical changes result in the production of a material having mild but quite valuable purifying action. The metallic oxide content, however, is not sufficiently high to produce a purifying agent of the high efficiency desired. Hence, it is preferred that, prior to roasting, the combined products be thoroughly mixed with a magnesium compound, such as magnesium hydroxide or magnesium carbonate. The magnesium hydroxide may, for example, be in the mineral form, brucite; the magnesium carbonate may be in the mineral form, magnesite; or the magnesium compounds may be obtained from other mineral sources, or from sea water.

Both the magnesium compound and the combined products should be finely ground before being mixed. When magnesium hydroxide is used, the mixture should be from about a 70-30 to about a 30-70 mixture, preferably, about a 50-50 mixture. If magnesium carbonate is used, a larger proportion of the magnesium compound is required in order to produce a final product having the desired magnesium content. In this case, therefore, the mixture should be from about a 75-25 to about a 45-55 mixture, preferably, a 60-40 mixture.

In any event, the mixture is calcined at a temperature of from about 600 to about 800 degrees C. for a length of time of from about 5 to about 30 minutes. The time will depend upon the temperature, the higher the temperature, the shorter the time. While not limited thereto, a temperature of from about 700 to about 750 degrees C. for from about 12 to about 15 minutes has been found to be particularly effective in producing a highly activated purifying medium.

The calcination changes a substantial portion of the minerals in the mixture to oxides, and other portions of the mixture undergo certain physical changes. These physical changes result in a lighter apparent density of the silica compounds of the mixture which improves the filtration rate of the final product. In addition, it appears that some of the inert material of the mixture acts as a carrier or spreading agent for the activated oxides. The calcination should not, however, be permitted to deadburn the mixture, but the ignition losses of the final product should be from about 2% to about 10%, preferably, about 5%.

If desired, the combined products and the magnesium compounds may be calcined separately and subsequently mixed.

It has been found that the uncalcined combined products have a pH of about 9.77 and that an uncalcined, 50-50 mixture of the combined products and the magnesium compound has a pH of about 10.2. After calcination, the mixture should have a pH of from about 11.3 to about 12.4 preferably, about 12.0.

The sugar solution to be treated in accordance with the present invention should be at room temperature during the addition of the activated mixture prepared as above, and, after well stirring, the solution is heated to from about 70 to about 90 degrees C., when a marked defecation of considerable volume takes place. Higher temperatures result in darkening of the solution and the formation of a finer precipitate, which does not filter well.

The heated solution is then settled and decanted, the precipitate being flocculent and bulky. The muds are filtered and the resulting filtrate is added to the clear liquor obtained from the decanting. The first defecation is now complete.

The pH of this solution is about 10.0 or slightly below and it is necessary to reduce the same to from about 5.0 to about 7.3. It is also necessary to precipitate impurities from the solution, for example, as phosphates or other insoluble compounds. For these purposes, the second defecation is resorted to. Phosphoric acid, or any other solution suitable for lowering the pH and producing insoluble precipitates, is added until the pH is within the range indicated and, after heating to from about 80 to about 90 degrees C., the solution, preferably, is filtered, or it is permitted to settle. If settled, the clear solution is drawn off and the muds are filtered. Here again, the precipitate is flocculent, but not quite as bulky as that resulting from the first defecation, and the filtration rate is high. The second defecation is now complete.

The end product of the above-described process is a purified, clear, brilliant, light straw colored solution, without undesirable odor, and having a fine flavor.

It will be noted that the process is simple and inexpensive to practice and it results in a product which is superior to any heretofore attained, particularly, by lime defecation.

This completes the description of my process for obtaining a highly purified, decolorized and deodorized sugar solution from cane or other sugar-bearing plant juices, raw sugar melts or washed raw sugar melts, or a highly purified fruit juice. It is, however, to be clearly understood that the foregoing description is merely illustrative, and I do not wish to be limited to the exact details herein set forth, inasmuch as changes may be made therein without the exercise of invention and within the true spirit and scope of the claims hereto appended. Furthermore, while the process has been described with special reference to sugar solutions, it is not limited thereto, but may be applied to other impurity-containing liquids, such as fruit juices, certain types of vegetable and mineral oils, water, etc.

Other objects and advantages of the process of my present invention will readily occur to those skilled in the art to which the same relates.

I claim:

1. The method of treating a sugar-containing solution which includes the steps of: adding to said solution from about .25% to about 6%, based on the weight of the total sugar solids in said solution, of from about a 70-30 to about a 30-70 mixture of a magnesium compound-containing material and the combined waste products resulting from the manufacture of Portland cement clinker, which mixture has been calcined at a temperature of from about 600 to about 800 degrees C. for from about 5 to about 30 minutes; removing therefrom the resulting precipitate; and thereafter adjusting the pH of the clear solution substantially to neutrality.

2. The method of treating a sugar-containing solution which includes the steps of: adding to said solution a sufficient quantity of from about a 70-30 to about a 30-70 mixture of a magnesium compound-containing material and the combined waste products resulting from the manufacture of Portland cement clinker, which mixture has been calcined at a temperature of from about 600 to about 800 degrees C. for from about 5 to about 30 minutes, to bring the pH of said solution to from about 9.0 to about 10.0; removing therefrom the resulting precipitate; and thereafter adjusting the pH of the clear solution substantially to neutrality.

3. The method of treating a sugar-containing solution which includes the steps of: adding to said solution from about .25% to about 6% based on the weight of the total sugar solids in said solution, of from about a 70-30 to about a 30-70 mixture of a magnesium compound-containing material and the combined waste products resulting from the manufacture of Portland cement clinker, which mixture has been calcined at a temperature and for a length of time sufficient to convert a substantial portion of the mineral components of said mixture to activated oxides and increase the porosity of the silica compounds thereof; removing therefrom the resulting precipitate; and thereafter adjusting the pH of the clear solution substantially to neutrality.

4. The method of treating a sugar-containing solution which includes the steps of: adding to said solution a sufficient quantity of from about a 70-30 to about a 30-70 mixture of a magnesium compound-containing material and the combined waste products resulting from the manufacture of Portland cement clinker, which mixture has been calcined at a temperature and for a length of time sufficient to convert a substantial portion of the mineral components of said mixture to activated oxides and increase the porosity of the silica compounds thereof, to bring the pH of said solution to from about 9.0 to about 10.0; removing therefrom the resulting precipitate; and thereafter adjusting the pH of the clear solution substantially to neutrality.

5. The method of treating a sugar-containing solution which includes the steps of: adding to said solution from about .25% to about 6%, based on the weight of the total sugar solids in said solution, of from about a 70-30 to about a 30-70 calcination-activated mixture of a magnesium compound-containing material and the combined waste products resulting from the manufacture of Portland cement clinker; removing therefrom the resulting precipitate; and thereafter adjusting the pH of the clear solution substantially to neutrality.

6. The method of treating a sugar-containing solution which includes the steps of: adding to said solution a sufficient quantity of from about a 70-30 to about a 30-70 calcination-activated mixture of a magnesium compound-containing material and the combined waste products resulting from the manufacture of Portland cement clinker to bring the pH of said solution to from about 9.0 to about 10.0; removing therefrom the resulting precipitate; and thereafter adjusting the pH of the clear solution substantially to neutrality.

7. The method of treating a sugar-containing solution which includes the steps of: adding to said solution from about .25% to about 6%, based on the weight of the total sugar solids in said solution, of from about a 70-30 to about a 30-70 calcination-activated mixture of a magnesium compound-containing material and the combined waste products resulting from the manufacture of Portland cement clinker; heating said solution to from about 70 to about 90 degrees C.; removing therefrom the resulting precipitate; adjusting the pH of said solution to from about 5.0 to about 7.3; again heating said solution to from about 80 to about 90 degrees C.; and again removing from said solution the resulting precipitate.

8. The method of treating a sugar-containing solution which includes the steps of: adding to said solution from about .25% to about 6%, based on the weight of the total sugar solids in said solution, of from about a 70-30 to about a 30-70 mixture of a magnesium compound-containing material and the combined waste products resulting from the manufacture of Portland cement clinker, which mixture has been calcined at a temperature from about 600 to about 800 degrees C. for from about 5 to about 30 minutes; heating said solution to from about 70 to about 90 degrees C.; removing therefrom the resulting precipitate; adjusting the pH of said solution to from about 5.0 to about 7.3; again heating said solution to from about 80 to about 90 degrees C.; and again removing from said solution the resulting precipitate.

9. The method of treating a sugar-containing solution which includes the steps of: adding to said solution a sufficient quantity of from about a 70-30 to about a 30-70 calcination-activated mixture of a magnesium compound-containing material and the combined waste products resulting from the manufacture of Portland cement clinker to bring the pH of said solution to from about 9.0 to about 10.0; heating said solution to from about 70 to about 90 degrees C.; removing therefrom the resulting precipitate; adjusting the pH of said solution to from about 5.0 to about 7.3; again heating said solution to from about 80 to about 90 degrees C.; and again removing from said solution the resulting precipitate.

10. The method of treating a sugar-containing solution which includes the steps of: adding to said solution a sufficient quantity of from about a 70-30 to about a 30-70 mixture of a magnesium compound-containing material and the combined waste products resulting from the manufacture of Portland cement clinker, which mixture has been calcined at a temperature and for a length of time sufficient to convert a substantial portion of the mineral components of said mixture to activated oxides and increase the porosity of the silica compounds thereof, to bring the pH of said solution to from about 9.0 to about 10.0; heating said solution to from about 70 to about 90 degrees C.; removing therefrom the resulting precipitate; adjusting the pH of said solution to from about 5.0 to about 7.3; again heating said solution to from about 80 to about 90 degrees C.; and again removing from said solution the resulting precipitate.

11. The method of treating a sugar-containing solution which includes the steps of: adding to said solution from about .25% to about 6%, based on the weight of the total sugar solids in said solution, of from about a 70-30 to about a 30-70 calcination-activated mixture of a magnesium compound-containing material and the combined waste products resulting from the manufacture of Portland cement clinker; heating said solution to from about 70 to about 90 degrees C.; removing therefrom the resulting precipitate; adding phosphoric acid to said solution to precipitate insoluble impurities and to adjust the pH thereof from about 5.0 to about 7.3; again heating said solution to from about 80 to about 90 degrees C.; and again removing from said solution the resulting precipitate.

12. The method of treating a sugar-containing solution which includes the steps of: adding to said solution a sufficient quantity of from about a 70-30 to about a 30-70 mixture of a magnesium compound-containing material and the combined waste products resulting from the manufacture of Portland cement clinker, which mixture has been calcined at a temperature of from about 600 to about 800 degrees C. for from about 5 to about 30 minutes, to bring the pH of said solution to from about 9.0 to about 10.0; heating said solution to from about 70 to about 90 degrees C.; removing therefrom the resulting precipitate; adding phosphoric acid to said solution to precipitate insoluble impurities and to adjust the pH thereof to from about 5.0 to about 7.3; again heating said solution to from about 80 to about 90 degrees C.; and again removing from said solution the resulting precipitate.

13. The method of treating a sugar-containing solution which includes the steps of: adding to said solution from about .25% to about 6%, based on the weight of the total sugar solids in said solution, of from about a 70-30 to about a 30-70 calcination-activated mixture of a magnesium compound-containing material and a mineral-containing material having the following average composition: calcite 32.8%, dolomite 2.0%, iron pyrite 1.0%, quartz 12.0%, graphite carbon 2.2%, mica 30.0%, feldspar 14.0%, and talc 6.0%; removing from said solution the resulting precipitate; and thereafter adjusting the pH of the clear solution substantially to neutrality.

14. The method of treating a sugar-containing solution which includes the steps of: adding to said solution from about .25% to about 6%, based on the weight of the total sugar solids in said solution, of from about a 70-30 to about a 30-70 calcination-activated mixture of a magnesium compound-containing material and a mineral-containing material having the following average composition: calcite 32.8%, dolomite 2.0%, iron pyrite 1.0%, quartz 12.0%, graphite carbon 2.2%, mica 30.0%, feldspar 14.0%, and talc 6.0%; heating said solution to from about 70 to about 90 degrees C.; removing therefrom the resulting precipitate; and thereafter adjusting the pH of said solution substantially to neutrality.

15. The method of treating a sugar-containing solution which includes the steps of: adding to said solution from about .25% to about 6%, based on the weight of the total sugar solids in said solution, of from about a 70-30 to about a 30-70 calcination-activated mixture of a magnesium compound-containing material and a mineral-containing material having the following average composition: calcite 32.8%, dolomite 2.0%, iron pyrite 1.0%, quartz 12.0%, graphite carbon 2.2%, mica 30.0%, feldspar 14.0%, and talc 6.0%; heating said solution to from about 70 to about 90 degrees C.; removing therefrom the resulting precipitate; adjusting the pH of said solution to from about 5.0 to about 7.3; again heating said solution to from about 80 to about 90 degrees C.; and again removing from said solution the resulting precipitate.

16. The method of treating a sugar-containing solution which includes the steps of: adding to said solution from about .25% to about 6%, based on the weight of the total sugar solids in said solution, of from about a 70-30 to about a 30-70 mixture of a magnesium compound-containing material and the combined waste products resulting from the manufacture of Portland cement clinker, which mixture has been calcined at a temperature and for a length of time sufficient to produce ignition losses in the final products of from about 2% to about 10%; removing from said solution the resulting precipitate; and thereafter adjusting the pH of the clear solution substantially to neutrality.

17. The method of treating a sugar-containing solution which includes the steps of: adding to said solution from about .25% to about 6%, based on the weight of the total sugar solids in said solution, of from about a 70-30 to about a 30-70 mixture of a magnesium compound-containing material and the combined waste products resulting from the manufacture of Portland cement clinker, which mixture has been calcined at a temperature and for a length of time sufficient to produce ignition losses in the final product of from about 2% to about 10%; heating said solution to from about 70 to about 90 degrees C.; removing therefrom the resulting precipitate; and thereafter adjusting the pH of the clear solution substantially to neutrality.

18. The method of treating a sugar-containing solution which includes the steps of: adding to said solution from about .25% to about 6%, based on the weight of the total sugar solids in said solution, of from about a 70-30 to about 30-70 mixture of a magnesium compound-containing material and the combined waste products resulting from the manufacture of Portland cement clinker, which mixture has been calcined at a temperature and for a length of time sufficient to produce ignition losses in the final product of from about 2% to about 10%; heating said solution to from about 70 to about 90 degrees C.; removing therefrom the resulting precipitate; adjusting the pH of said solution to from about 5.0 to about 7.3; again heating said solution to from about 80 to about 90 degrees C.; and again removing from said solution the resulting precipitate.

JOHN J. NAUGLE.

REFERENCES CITED

The following references are of record in the file of this patent:

UNITED STATES PATENTS

| Number | Name | Date |
| --- | --- | --- |
| 1,653,491 | Borden | Dec. 20, 1927 |
| 2,422,699 | Naugle | June 24, 1947 |

FOREIGN PATENTS

| Number | Country | Date |
| --- | --- | --- |
| 190 | Great Britain | of 1877 |
| 1,576 | Great Britain | of 1914 |

OTHER REFERENCES

The Int. Sugar Jour., vol. 9, 1907, page 540.